(12) United States Patent
Mehtälä

(10) Patent No.: US 10,116,448 B2
(45) Date of Patent: Oct. 30, 2018

(54) TRANSACTION AUTHORIZATION METHOD AND SYSTEM

(71) Applicant: MEONTRUST INC., Oulu (FI)

(72) Inventor: Markku Mehtälä, Oulu (FI)

(73) Assignee: Meontrust Inc (FI)

( * ) Notice: Subject to any disclaimer, the term of this patent is extended or adjusted under 35 U.S.C. 154(b) by 0 days.

(21) Appl. No.: 14/778,671

(22) PCT Filed: Mar. 21, 2014

(86) PCT No.: PCT/FI2014/050209
§ 371 (c)(1),
(2) Date: Sep. 21, 2015

(87) PCT Pub. No.: WO2014/147297
PCT Pub. Date: Sep. 25, 2014

(65) Prior Publication Data
US 2016/0056962 A1 Feb. 25, 2016

(30) Foreign Application Priority Data
Mar. 22, 2013 (FI) ...................................... 20135275

(51) Int. Cl.
*H04L 29/00* (2006.01)
*H04L 9/32* (2006.01)
(Continued)

(52) U.S. Cl.
CPC ............ *H04L 9/3247* (2013.01); *G06F 21/42* (2013.01); *G06Q 20/12* (2013.01);
(Continued)

(58) Field of Classification Search
None
See application file for complete search history.

(56) References Cited

U.S. PATENT DOCUMENTS 7,613,919 B2   11/2009  Bagley
8,819,432 B2 *  8/2014  Bergsten ................. H04L 63/08
                                              380/28
(Continued)

FOREIGN PATENT DOCUMENTS

EP    1871065 A1    12/2007
WO    9944114 A1     9/1999
(Continued)

OTHER PUBLICATIONS

Search Report for Finnish Patent Application No. 20135275; dated Nov. 12, 2013.
(Continued)

*Primary Examiner* — Madhuri R Herzog
(74) *Attorney, Agent, or Firm* — Barnes & Thornburg LLP

(57) ABSTRACT

Authorizing transactions by an authentication provider involves at least one preparatory phase and an authorization phase. The preparatory phase includes registering a user account with several personal devices, each with an authentication application installed. The authorization phase receives knowledge of the transaction; determines the user account related to the transaction; determines at least one personal device registered with the user account related to the transaction; receives a request for details specific to the transaction from at least one personal device; provides the authentication application of the at least one personal device with the requested details specific to the transaction; receives from the authentication application a digitally signed transmission which indicates transaction-specific instructions received by the authentication application; and authorizes or denies the transaction based on the received transaction-specific instructions.

15 Claims, 4 Drawing Sheets

(51) Int. Cl.
*H04L 29/06* (2006.01)
*G06F 21/42* (2013.01)
*H04W 12/06* (2009.01)
*G06Q 20/12* (2012.01)
*G06Q 20/32* (2012.01)
*G06Q 20/38* (2012.01)
*G06Q 20/42* (2012.01)

(52) U.S. Cl.
CPC ..... *G06Q 20/3227* (2013.01); *G06Q 20/3825* (2013.01); *G06Q 20/425* (2013.01); *H04L 9/3234* (2013.01); *H04L 9/3263* (2013.01); *H04L 63/0823* (2013.01); *H04L 63/0853* (2013.01); *H04L 63/0869* (2013.01); *H04L 63/0892* (2013.01); *H04W 12/06* (2013.01); *H04L 2209/56* (2013.01)

(56) References Cited

U.S. PATENT DOCUMENTS

| | | | |
|---|---|---|---|
| 9,852,416 B2* | 12/2017 | Mahaffey | H04L 67/16 |
| 2001/0044900 A1* | 11/2001 | Uchida | G06F 21/32 |
| | | | 713/186 |
| 2002/0181710 A1* | 12/2002 | Adam | G06Q 20/02 |
| | | | 380/270 |
| 2004/0019564 A1 | 1/2004 | Goldthwaite et al. | |
| 2005/0278542 A1 | 12/2005 | Pierson et al. | |
| 2009/0119754 A1* | 5/2009 | Schubert | H04L 63/0853 |
| | | | 726/4 |
| 2010/0257366 A1* | 10/2010 | Leclercq | G06F 21/35 |
| | | | 713/173 |
| 2011/0016320 A1 | 1/2011 | Bergsten et al. | |
| 2011/0071914 A1* | 3/2011 | Beasley | G06Q 20/105 |
| | | | 705/21 |
| 2011/0213711 A1* | 9/2011 | Skinner | G06F 21/43 |
| | | | 705/71 |
| 2011/0264910 A1 | 10/2011 | Masuda | |
| 2013/0007434 A1 | 1/2013 | King et al. | |
| 2013/0268439 A1* | 10/2013 | Lowe | G06Q 20/42 |
| | | | 705/44 |
| 2013/0308778 A1* | 11/2013 | Fosmark | H04L 63/0823 |
| | | | 380/270 |

FOREIGN PATENT DOCUMENTS

| | | |
|---|---|---|
| WO | 2008039582 A2 | 4/2008 |
| WO | 2009031159 A2 | 3/2009 |
| WO | 2010140876 A1 | 12/2010 |
| WO | 2012131172 A1 | 10/2012 |

OTHER PUBLICATIONS

Search Report for International Patent Application No. PCT/FI2014/050209; dated Jul. 23, 2014.
International Preliminary Report on Patentability for International Patent Application No. PCT/FI2014/050209; dated May 5, 2015.
Extended European Search Report for corresponding EP 14 768 851.9 dated Sep. 8, 2016.
EP Search Report for corresponding EP 14 768 851.9 dated Jan. 30, 2018.

* cited by examiner

TRANSACTION AUTHORIZATION METHOD AND SYSTEM

PRIORITY CLAIM

This patent application is a U.S. National Phase of International Patent Application No. PCT/FI2014/050209, filed 21 Mar. 2014, which claims priority to Finnish Patent Application No. 20135275, filed 22 Mar. 2013, the disclosures of which are incorporated herein by reference in their entirety.

FIELD

Disclosed embodiments relate to techniques, including methods, equipment and software for authorization of transactions.

Disclosed embodiments provide methods, systems and computer program carriers with improved flexibility.

SUMMARY

Disclosed embodiments provide a method for authorizing a transaction. Disclosed embodiments also provide an apparatus (authentication provider) specifically adapted to carry out the disclosed method. Disclosed embodiments further provide an authentication program product whose execution in the authentication provider apparatus causes the apparatus to carry out the disclosed method.

DETAILED DESCRITION OF THE DISCLOSED EMBODIMENTS

Figure 1:
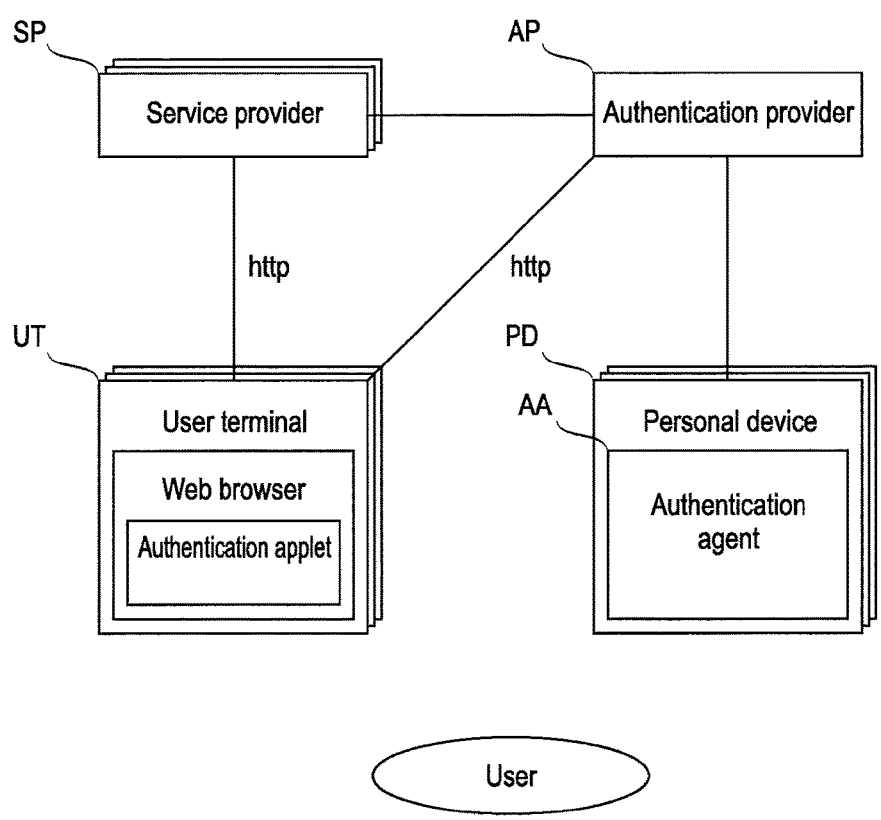
FIG. 1 schematically shows network elements and nodes for implementing the disclosed embodiments.

The discleod method can be implemented via acts performed by a telecommunications server configured to act as an authentication provider. The acts comprise at least one preparatory phase and at least one authorization phase. wherein the at least one preparatory phase comprises for each of several user accounts:
  registering the user account via a user terminal;
  registering a plurality of personal devices with the registered user account, which comprises registering an authentication application installed in each registered personal device; this may require transmission of an authentication application to the registered personal device, unless one is installed already;
  wherein the authentication application is configured to:
    indicate at least a subset of received transaction-specific details via a user interface;
    receive transaction-specific instructions via the user interface; and
    digitally sign the transaction-specific instructions by using a cryptographic private key assigned to the user account;
wherein the at least one authorization phase comprises for each of several transactions related to one of the several user accounts:
  receiving knowledge of the transaction;
  determining the user account related to the transaction;
  determining at least one personal device registered with the user account related to the transaction;
  receiving a request for details specific to the transaction from at least one personal device;
  providing the authentication application of the at least one personal device with the requested details specific to the transaction;
  receiving from the authentication application a digitally signed transmission which indicates transaction-specific instructions received by the authentication application; and
  authorizing or denying the transaction based on the received transaction-specific instructions.

An authentication provider may be implemented as a web server, and a connection from the web server and an authentication application installed in the user's personal device(s) can be attained over any available internet connection. For purposes of the present disclosure, the term "user terminal" means any terminal by which services can be accessed over a wide-area network. A prime example is a personal computer with an internet browser, but as is well known, services can be remotely accessed by utilizing a wide range of terminals, including but not limited to laptop and palmtop computers, tablet computers, smart phones, home entertainment devices or the like. For purposes of the present disclosure, the element "personal device" is used to execute an authentication application trusted by the disclosed authentication provider. Accordingly, the personal device is most conveniently, but non-restrictively, implemented as a personal device provided with user authentication means. A smart mobile telephone, tablet or portable or pocket-sized data terminal that requests the user to enter a PIN code serves as an illustrative example. These two terminals utilized by the user may be two distinct pieces of equipment or two separate functionalities provided by one piece of equipment. An example of the former implementation is a combination of a personal computer plus mobile telephone. An example of the latter implementation is a smart phone that implements a PIN-secured mobile telephone and an internet browser in a single piece of equipment. In the interest of clarity, the terms "user terminal" and "personal device" will be used later in this document, but those skilled in the art will realize that both functionalities may be provided by a single piece of equipment.

The above definition comprises two optional steps which, strictly speaking, are not absolutely necessary. In an alternative implementation, the authentication provider may spontaneously send push notification messages to the user terminal. In such implementations the user terminal does not have to send the poll messages to the authentication provider.

Some disclosed embodiments utilize various security policies concerning different types of personal devices, or entire platforms. For instance, some smartphone platforms have a better reputation than others, as regards vulnerability to security breaches. For instance, a service provider may require that authorization of financial transactions require some specific platforms, types of personal devices, and/or additional security devices, such as fingerprint or iris scanning, firmware certificates (chip cards and readers), or the like. Such additional constraints may be required for financial transactions having a high value and/or an unusually high risk. Indicators of high risk may include a short or poor credit history of the user, for example. Additional security against hackers may be obtained by requiring that high-value or high-risk transactions be confirmed with two or more personal devices. A security policy that requires confirmation from two or more personal device provides additional security against stealing a legitimate user's personal device. Confirmation from two or more personal device may not provide sufficient security against malware attacks because a piece of malware that affect one personal devices may easily affect several devices of the same type of platform. Accordingly, a security policy for high-value or high-risk transactions may require that transactions be confirmed with two or more personal devices of different platform or type. Alternatively or additionally, if a transaction is performed on a personal device of a first platform or type, it must be confirmed on a personal device of a different platform or type. Some security policies may require that a transaction be confirmed on a personal device of a specific type or platform. Conversely, some types or platforms may be black-listed in the sense that they are not accepted, at least not as the only personal device or absent further verification of the user's identity, to authorize high-value or high-risk transactions.

FIG. 1 schematically shows network elements and nodes for implementing the disclosed embodiments. A user uses a user terminal UT to access services of a service provider SP. In the present context, the service provider SP refers to a server or network node operated by a service operator. The user terminal UT is any kind of a data processing device operable to execute a web browser. A non-exhaustive list of applicable data processing devices includes desktop and laptop computers, tablet devices and smart telephones. The present, non-restrictive example relates to a case wherein, during actual service provisioning, the user terminal UT and service provider SP communicate by using conventional internet protocols or protocol suites, such as http, https and www. Those skilled in the art will realize that the disclosed embodiments are equally applicable to other protocol suites, such as CORBA.

In traditional service provisioning, each service provider SP authenticates each user terminal UT separately. Such authentication can be based on the traditional username/password combination, which involves several security problems, as is well known in the art. Data security can be improved by using one-time passwords, as is disclosed in the above-identified U.S. Pat. No. 7,613,919. That technology causes the residual problems identified in the background section of this document. The residual problems are solved, or at least alleviated, by using a centralized authentication provider AP, which is configured to authenticate the user terminal UT of a user by communicating with an authentication application installed in a personal device PD associated with that user. As stated earlier, the user terminal UT and personal device PD can be separate devices or two functionalities provided by a single piece of equipment, such as a smart telephone. For the purposes of the present disclosure, the user terminal UT is used for accessing services of the service provider, while the personal device PD is needed for authenticating a user of the user terminal and personal device. Those skilled in the art will realize that both functionalities may be provided by modern smart telephones, for example.

In a typical scenario, there's a one-to-one relation between users and personal devices on one hand and between users and user terminals on the other hand. In other words, each user uses at least one personal device, and in a normal case, exactly one. Similarly, each user uses at least one user terminal, and in a normal case, exactly one. There is many-to-many relation between service providers and user terminals. This means that each user terminal may access, and typically does, services from several service providers, while each service provider provides services to several user terminals. On the other hand, the authentication provider has one-to-many relations to the personal devices on one hand and to the service providers on the other hand. This means that one authentication provider can service authentication requests from several personal devices and authenticate their users and associated user terminals to several service providers. This means that the disclosed technique can be used to concentrate authentication tasks into a centralized authentication provider capable of servicing multiple users and multiple service providers.

Figure 2:
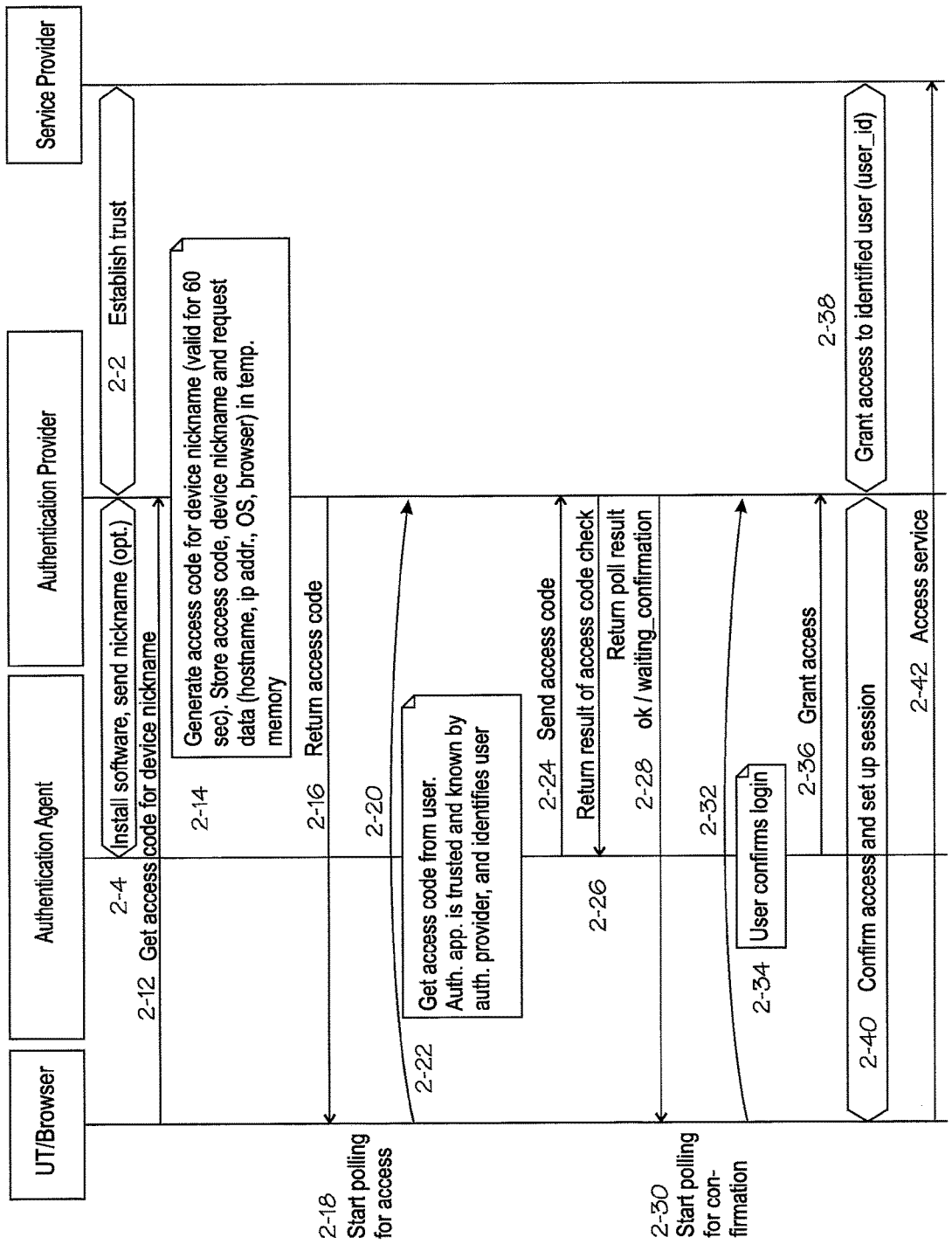
FIG. 2 illustrates preparatory steps for authentication and transaction authorization in the environment shown in FIG. 1.

FIG. 2 illustrates preparatory steps for authentication and transaction authorization in the environment shown in FIG. 1. FIG. 2 shows an exemplary set of acts or steps to be performed by which one personal device may be provided with an authentication agent. To register multiple personal devices for a single user, the preparatory steps of FIG. 2 will be repeated for each separate device.

FIG. 2 will be described for a general case in which one or more user devices or their users are authenticated for whatever purpose, such as for granting access to a service. Later, in connection with FIG. 3, use cases will be described wherein a specific purpose of authentication is authorization of one or more pending transactions.

A majority of the acts shown in FIG. 2 relate to session establishment between a user terminal UT and service provider SP, although the first two steps 2-2 and 2-4 are configuration steps which will remain effective over several sessions. In step 2-2 a trust relationship is established between the service provider SP and the authentication provider AP. The trust relationship can be based on static trust, where the authentication provider AP is deployed in the same infrastructure as the service provider SP, or the authentication provider is otherwise controlled by the service provider. Alternatively, the trust relationship can be a dynamic one, such that the service provider SP and authentication provider AP exchange a shared secret or mutually authenticate each other by means of certificates. By way of example, U.S. Pat. Nos. 4,200,770, 5,375,169, and 5,583,939 disclose applicable techniques for exchanging a shared secret for the purpose of establishing trust. The objective is to have a trust relationship between the the service provider SP and the authentication provider AP, such that the service provider SP will be able to rely on information sent by the authentication provider AP. The information sent by the authentication provider AP to the service provider may include identification information, such as a user identifier, for identifying the user terminal UT and/or its user.

In step 2-4 an authentication application AA is installed in the personal device PD. In other use cases the authentication application AA may be pre-installed in the personal device PD, in which case only a client-side provisioning with appropriate parameters is performed. Similarly to the trust establishment between the service provider SP and authentication provider AP, a trust relationship is established between the authentication application AA of the personal device PD and the authentication provider AP. According to at least one disclosed embodiment, the installation of the authentication application AA in the personal device PD includes sending a device nickname of the personal device PD to the authentication provider AP. Use of the device nickname reduces the vulnerability of the system to hacking and phishing, as will described later.

After the preparatory steps 2-2 and 2-4, step 2-12 begins a set of session-specific steps. In step 2-12, the browser applet in the user terminal UT sends an access code request to the authentication provider. The access code request includes data for identifying the user terminal UT. For example, the access code request may contain one or more of the following: host name, IP address, operating system, browser name and version. According to at least one disclosed embodiment, the access code request also contains the nickname assigned to the personal device PD. The nickname does not have to be globally unique, but coupling the requested access code to a nickname assigned by the user increases data security because the access code is only valid for the specified nickname. In step 2-14 the authentication provider performs several internal tasks. First, it generates the requested access code. According to at least one disclosed embodiment, the access code is tied to the nickname assigned to the authentication application AA of the personal device PD. According to another disclosed embodiment, the access code has a very limited lifetime, not much longer than what the human user needs to read the access code from the user interface UI1 of the user terminal and to enter it via the user interface UI2 of the mobile device, plus some processing delays. The lifetime for the access code may be set to one minute, for example. Second, the authentication provider stores the generated access code, the device nickname (if used) and the association between these elements in a temporary storage. Third, the authentication provider stores details of the access code request, such as the user terminal's IP address, browser name and version, operating system, host name, or the like.

In step 2-16 the authentication provider returns the access code that the browser applet requested in step 2-12. In step 2-18 the authentication applet starts a polling loop in which it periodically polls the authentication provider for results of an access code check. Reference numeral 2-20 indicates one example of such polling messages, but the user terminal UT repeatedly sends such polling messages until it receives a result from the authentication provider AP.

In at least one disclosed embodiment, it is assumed that the human user reads the access code from the user interface of the user terminal and enters it via the user interface of the mobile device. In step 2-22 the authentication application AA being executed on the personal device PD detects the access code. The authentication application AA, which is trusted by the authentication provider AP, identifies the user. In at least one disclosed embodiment, any user entitled to use the mobile device is considered identified. Other disclosed embodiments may implement more ambitious user identification schemes, such as requesting the user to enter the personal device's PIN code, for example.

In step 2-24 the authentication application AA sends the access code to the authentication provider AP. In step 2-26 the authentication provider AP returns a result (success or failure) of the access code check to the authentication application AA. In case of success the authentication provider AP can also return information concerning the user terminal UT that requested the access code. The authentication application can show this information to the user, so as to give the user more assurance that the login process is with the user's own user terminal UT. In step 2-28 the authentication provider returns a polling result to the browser applet in the user terminal. In step 2-30 the authentication applet AA starts a polling loop in which it periodically polls the authentication provider AP for confirmation of granted access. Reference numeral 2-32 indicates one example of such polling messages, but the user terminal UT repeatedly sends such polling messages until it receives a confirmation from the authentication provider AP.

In step 2-34 the authentication application AA receives a login confirmation from the user, and in step 2-36 it sends a grant access message to the authentication provider AP, thus informing the authentication provider AP that the user terminal should be granted access.

At this point the user terminal UT is authenticated by an entity trusted by the service provider SP, namely the authentication provider AP. The authentication provider AP trusts the authentication provided by the personal device PD (and by a mobile network operator). Because the authentication provider AP receives the access code from the authenticated personal device PD shortly after sending the access code to the user terminal UT (in this example over the internet), the authentication provider AP has effectively authenticated the user of the user terminal UT. From this point on, process is relatively simple in the sense that all parties can trust each other and no further authentication acts need be performed. Accordingly, the following acts can be performed in any of several ways known in the art, and such acts need not be described in great detail. For the purposes of the present disclosure, it suffices to say that in step 2-38 the authentication provider AP sends a grant access message to the actual service provider SP. In step 2-40 the authentication provider AP confirms the access to the user terminal UT and sets up a session for it. Finally, in step 2-42 the user terminal UT accesses the service offered by the service provider SP.

It was stated in connection with step 2-14 that the authentication provider AP stores the generated access code and the associated identification parameters in a temporary storage. In the present context, temporary storage means that any long-term storage is not necessary. For example, the temporary storage may be implemented by using a FIFO (first in, first out) buffer, such that the memory used by the oldest contents will be reused by the newest content. Alternatively, the temporary storage may be implemented by periodically purging the storage from content whose age exceeds some threshold value. The threshold value for purging old content can be quite small, in view of the fact that the contents of the temporary storage need be kept in memory only for a time sufficient to complete the user terminal's authentication. One minute is normally quite sufficient.

As stated above, an optional feature involves restricting the access code to the nickname of the personal device PD. This optional feature reduces the system's vulnerability to hacking and phishing attempts because the access code generated by the authentication provider AP is only effective if entered from a personal device that the nickname has been assigned to. The nickname need not be globally unique, however.

FIGS. 1 and 2 and their associated descriptions relate to an ambitious implementation in which a centralized authentication provider AP is configured to serve several service providers SP, and a trust relationship between the authentication provider AP and the several service providers SP is established by cryptographic means, such as by using certificates or trusted secrets. Naturally it is possible to implement the disclosed embodiments in a less ambitious manner, such that each of several operators implement the service providers SP and authentication providers AP in a commonly administered infrastructure, such as a subnetwork, in which case the trust relationship between the authentication provider AP and the service providers SP is implicit.

It was stated above, in connection with step 2-22, that the access code may be manually transferred from the user terminal UT to the authentication application AA. In a more ambitious implementation, the user terminal UT may convey the access code to the authentication application AA automatically, by using a short-range connection, such as Bluetooth, NFC (Near Field Communication), WLAN, infrared communications, or the like.

It should be understood that the series of preparatory acts described in connection with FIG. 2 is but one illustrative but non-restrictive technique for coupling a personal device and its user. Alternative techniques do exists, many of which are based on the use of tokens or digital certificates. For example, on mobile platforms that only execute applications that are certified by the platform provider, a digitally signed application may read the personal device's hardware identifier, such as IMEI (International Mobile Equipment Identity) or similar identifier, and relays that to the authentication provider AP, which compares the hardware identifier of the sending device with a list of devices registered with the user.

Figure 3:
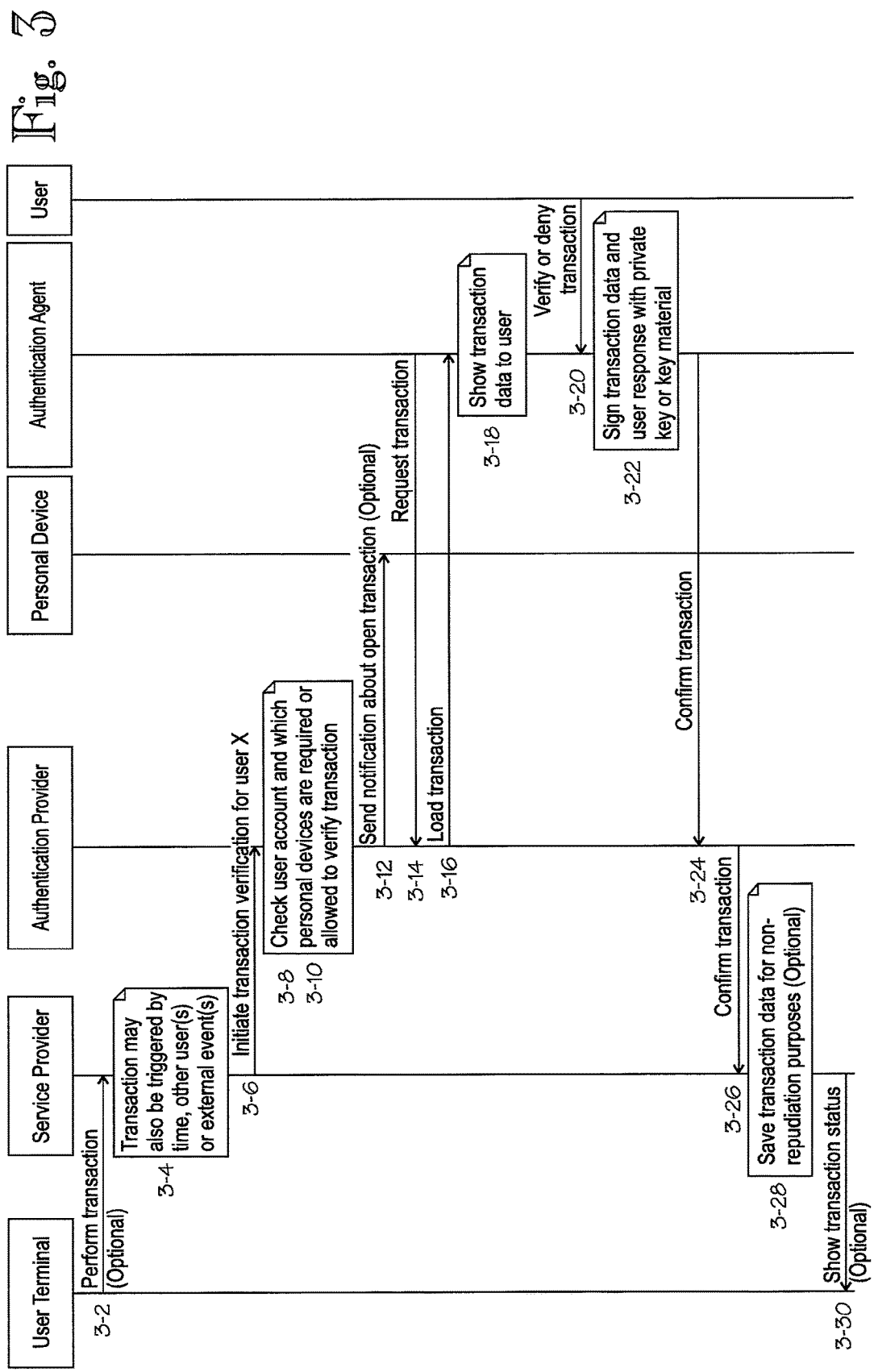
FIG. 3 illustrates an authentication/authorization procedure in the environment shown in FIG. 1.

FIG. 3 shows how a disclosed embodiment can facilitate use of multiple alternative personal communication devices for authorzation of transactions. In step 3-2 the service provider SP obtains knowledge of a transaction relating to the user of the user terminal UT. The service provider SP may obtain knowledge of the transaction from the user terminal UT, as indicated by step 3-2 in FIG. 3, or from other sources. For instance, the service provider may provide services that are triggered on the basis of time, as shown by action box 3-4. An example of a time-triggered service is periodically recurring payments. Another example is an online auction wherein the user of the user terminal UT places a bid but that bid matures into a transaction only when the auction closes when the sale period expires.

Regardless of the way the service provider SP obtains knowledge of the transaction, the authentication provider AP obtains knowledge of the transaction in step 3-6. The authentication provider AP may obtain knowledge of the transaction from the service provider SP, as shown in FIG. 3, but in alternative implementations the user terminal UT may request authentication from the authentication provider AP. In step 3-8 the authentication provider AP determines which user account the transaction relates to. Typically the transaction relates to a name of user, but there may be multiple users with identical names, and the authentication provider or a cooperating entity, such as the service provider, may have to employ disambiguation techniques, such as address checking, to resolve the correct user. In step 3-10 the authentication provider AP determines which personal devices have been registered with the user and which, consequently, can be used to authenticate the user. In some implementations, one or more personal device may be required to authenticate the user and/or to authorize an individual transaction.

In an optional step 3-12, the authentication provider AP sends a notification to one or more of the user's personal devices which can be used to authorize the present transaction. Step 3-12 is optional, at least in cases wherein the user initiated the process via step 3-2, because the user already knows of the pending transaction. On the other hand, the user does not necessarily know of time-triggered transactions (step 3-4), and an explicit notification provides useful information to the user.

In step 3-14 the user uses an authentication agent in one of the personal devices to send a request to the authentication provider AP. The request received by the authentication provider AP relates to details of the pending transaction. In step 3-16 the authentication provider AP sends the requested details of the pending transaction to the user's personal device, and more specifically, to the authentication agent running in the personal device. In step 3-18 the authentication agent indicates the details of the pending transaction to the user via the personal device's user interface. Typically the details are shown on the personal device's display, but audible indication via speech synthesis is also possible. In step 3-20 the authentication agent receives an indication concerning the user's decision from the user interface. Typically the indication is received from the personal device's keypad or a virtual keypad implemented on a touch-sensitive display, but audible indication via speech recognition is also possible.

In step 3-22 the authentication agent AA digitally signs the transaction data, or a subset of it, and the user's instructions. The authentication agent may sign the transaction data and the user's instructions with the user's private key or similar cryptographic material. As regards the subset of the transaction data, it should specify which transaction the user's instructions relate to and, optionally a monetary amount of the transaction, at least in cases wherein the user basically approves the transaction but not the default or proposed amount. As regards the user's transaction-specific instructions, they should indicate the user's approval or rejection, which may also be partial. For instance, the user may approve the price of goods or services but not some or all surcharges. In the case of partial approvals, the user's transaction-specific instructionsmay include a message for explaining the partial approval.

In step 3-24 the authentication agent AA sends the user's cryptographically signed transaction-specific instructions regarding the pending transaction to the authentication provider AP. In step 3-26 the authentication provider AP relays the user's transaction-specific instructions to the service provider. In FIG. 3 the service provider is presented as an integrated entity, but in reality it may consist of multiple related entities, one of which provides the actual service while another entity manages the service provider's finances. In a distributed implementation a service-providing entity may inform the authentication provider of the transaction in step 3-6 while the finance-managing entity receives the user's instructions in step 3-26.

In an optional step 3-28 the service provider or its finance-managing entity stores the user's transaction-specific instructions. They may be needed for non-repudiation purposes, for example. In another optional step 3-30 a notification of the status of the transaction may be relayed to the user terminal UT, which typically comprises a network browser and/or e-mail client, and ample data storage facilities.

Figure 4:
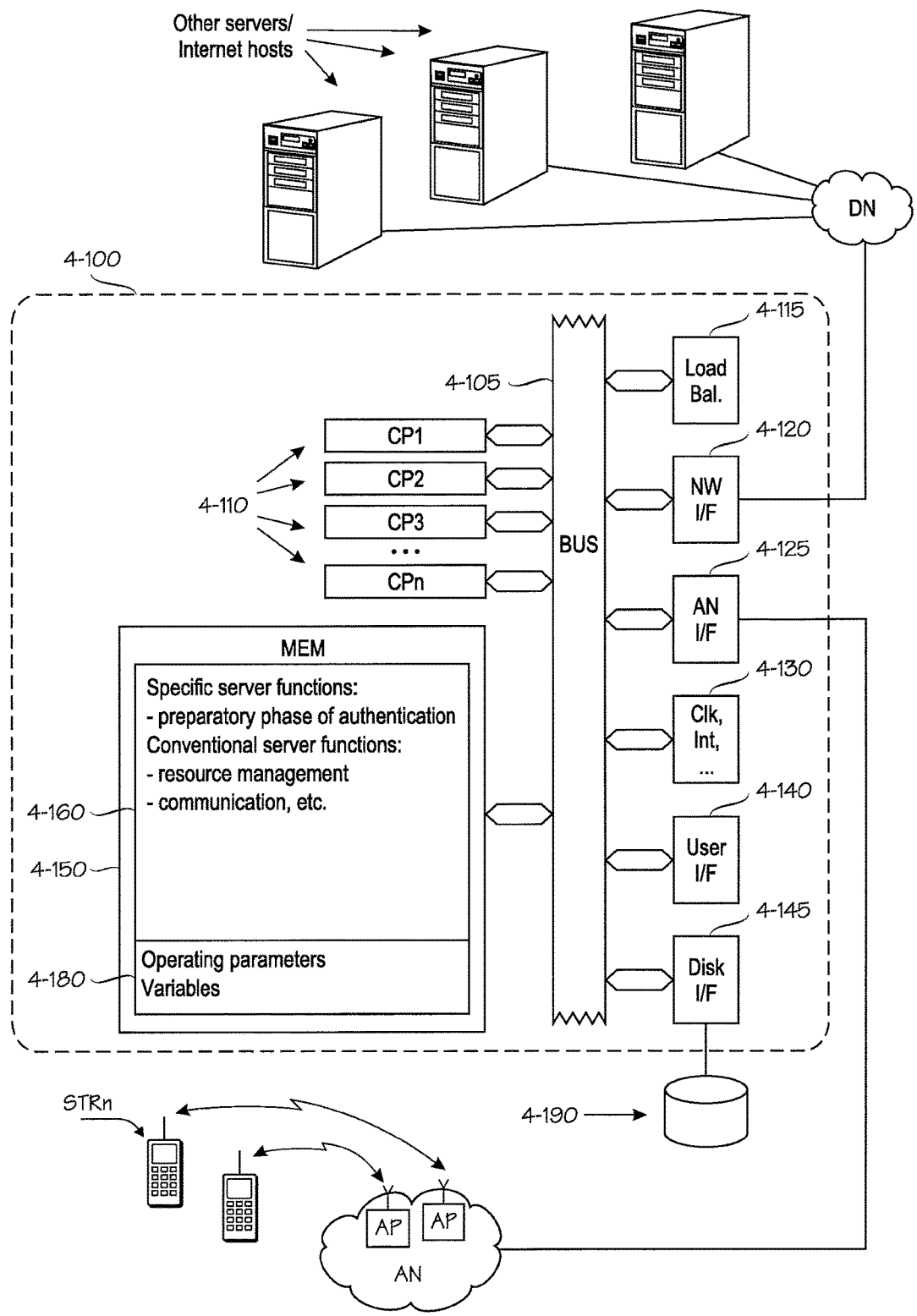
FIG. 4 schematically shows an exemplary block diagram for the various information processing servers described herein.

FIG. 4 schematically shows an exemplary block diagram for the various information processing servers described herein. For instance, such a server architecture, generally denoted by reference numeral 4-100, can be used to implement various disclosed embodiments of the authentication provider.

The two major functional blocks of the database server system SS are a server computer 4-100 and a storage system 4-190. The server computer 4-100 comprises one or more central processing units CP1 . . . CPn, generally denoted by reference numeral 4-110. Disclosed embodiments comprising multiple processing units 4-110 may be provided with a load balancing unit 4-115 that balances processing load among the multiple processing units 4-110. The multiple processing units 4-110 may be implemented as separate processor components or as physical processor cores or virtual processors within a single component case. The server computer 4-100 further comprises a network interface 4-120 for communicating with various data networks, which are generally denoted by reference sign DN. The data networks DN may include local-area networks, such as an Ethernet network, and/or wide-area networks, such as the internet.

The server computer 4-100 of the present embodiment may also comprise a local user interface 4-140. Depending on implementation, the user interface 4-140 may comprise local input-output circuitry for a local user interface, such as a keyboard, mouse and display (not shown). Alternatively or additionally, management of the server computer 4-100 may be implemented remotely, by utilizing the network interface 4-120 and any internet-enabled terminal that provides a user interface. The nature of the user interface depends on which kind of computer is used to implement the server computer 4-100. If the server computer 4-100 is a dedicated computer, it may not need a local user interface, and the server computer 4-100 may be managed remotely, such as from a web browser over the internet, for example. Such remote management may be accomplished via the same network interface 4-120 that the server computer utilizes for traffic between itself and the client terminals.

The server computer 4-100 also comprises memory 4-150 for storing program instructions, operating parameters and variables. Reference numeral 4-160 denotes a program suite for the server computer 4-100.

The server computer 4-100 also comprises circuitry for various clocks, interrupts and the like, and these are generally depicted by reference numeral 4-130. The server computer 4-100 further comprises a storage interface 4-145 to the storage system 4-190. When the server computer 4-100 is switched off, the storage system 4-190 may store the software that implements the processing functions, and on power-up, the software is read into semiconductor memory 4-150. The storage system 4-190 also retains operating and variables over power-off periods. The various elements 4-110 through 4-150 intercommunicate via a bus 4-105, which carries address signals, data signals and control signals, as is well known to those skilled in the art.

The disclosed techniques may be implemented in the server computer 4-100 as follows. The program suite 4-160 comprises program code instructions for instructing the set of processors 4-110 to execute the functions of the disclosed method, wherein the functions include controlling communication with the user terminals, service providers and personal devices, as described earlier.

U.S. Pat. No. 7,613,919 discloses systems, computer program products and methods for authentication using a one-time password. In a system that includes a client, a service provider, and an authentication service, the authentication service generates an authentication service identifier for the client. Any suitable identifier may be used for the authentication service identifier, which generally takes the form of an arbitrary number of characters. From the client, the authentication service receives a client moniker, such as a username for the client to use when accessing the authentication service. The authentication service sends a one-time password to the client for the client to use in accessing the service provider. When the authentication service receives a one-time password from the service provider, the authentication service sends the authentication service identifier for the client to the service provider to authenticate the client if the one-time password received from the service provider matches the one-time password sent to the client.

U.S. Pat. No. 7,613,919 is one example of documents that disclose techniques for enhancing conventional username/password-based authentication schemes with one-time passwords ("OTP"). A problem with such techniques disclosed is that the use of the username and a long-term password is required. This is a problem for the users who must manage and remember combinations of usernames and passwords, which should be different for each and every service or service provider accessed by the user. This is also a problem for the service providers who have to ensure that the usernames are unique within the user community. Yet another problem associated with the technology of U.S. Pat. No. 7,613,919 is that it burdens the service providers with authentication tasks. In other words, each service provider must address authentication issues separately.

WO2012/131172, which is a commonly owned PCT application publication, discloses an authenticating technique comprising: establishing trust between an authentication provider and service provider; establishing trust between the authentication provider and authentication application installed in a terminal. The authentication provider performs, for each session: receiving an access code request and connection information from the terminal; generating and storing the access code; sending it to the terminal; receiving the access code from the authentication application; indicating verification of the access code to the authentication application and terminal; receiving, from the authentication application, a request to grant access to the terminal; instructing the service provider to grant access; sending a confirmation of the granted access to the terminal. An authenticated session between the terminal and the service provider is set up for providing services to the terminal.

The invention claimed is:

1. A method for authorizing a transaction, the method comprising the following acts performed by a telecommunications server configured to act as an authentication provider:
    at least one preparatory phase; and
    at least one authorization phase;
    wherein the at least one preparatory phase comprises for each of several user accounts:
        registering a user account via a user terminal;
        registering a plurality of personal devices with the registered user account, wherein registering of a personal device comprises registering an authentication application installed in that personal device;
    wherein the authentication application in the registered personal device is configured to:
        indicate at least a subset of received transaction-specific details via a user interface;
        receive transaction-specific instructions via the user interface; and
        digitally sign the transaction-specific instructions by using a cryptographic private key assigned to the user account;
    wherein the at least one authorization phase performed by the telecommunications server comprises for each of several transactions related to one of the several user accounts:
        receiving knowledge of a transaction relating to a user of a user terminal;
        determining, in response to receiving the knowledge, a user account related to the transaction;
        receiving a request for details specific to the transaction from at least one personal device;

checking, whether the at least one personal device wherefrom the request is received belongs to the plurality of personal devices registered with the user account determined to relate to the transaction;

providing, in response to the at least one personal device wherefrom the request is received belonging to the plurality of personal devices registered with the user account determined to relate to the transaction, the requested details specific to the transaction to the authentication application in the at least one personal device wherefrom the request for details specific to the transaction were received;

receiving, after the providing, from the authentication application in the at least one personal device a digitally signed transmission which indicates transaction-specific instructions received via the user interface by the authentication application in the at least one personal device; and authorizing or denying the transaction based on the received transaction-specific instructions.

2. The method according to claim 1, further comprising establishing a trust relationship between the authentication provider and at least one service provider.

3. The method according to claim 2, wherein said establishing the trust relationship comprises exchanging a shared cryptographic secret between the authentication provider and the at least one service provider.

4. The method according claim 2, wherein said establishing the trust relationship comprises mutual authentication by means of one or more public key infrastructure certificates.

5. The method according to claim 1, further comprising establishing a trust relationship between the authentication provider and the at least one authentication application.

6. The method according to claim 5, wherein said establishing the trust relationship between the authentication provider and the at least one authentication application comprises provisioning a public key infrastructure certificate from the authentication provider to the authentication application.

7. The method according to claim 5, wherein said establishing the trust relationship between the authentication provider and the at least one authentication application comprises using a shared secret key and authentication application private key.

8. The method according to claim 1, wherein said registering of the authentication application comprises causing transmission of the authentication application to at least one of the registered personal devices.

9. The method according to claim 1, wherein the authentication provider maintains a plurality of different security policies and applies a subset of the maintained security policies depending on a type and/or platform of the personal device that comprises the authentication application from which the authentication provider receives the digitally signed transmission.

10. The method according to claim 9, wherein the subset of applied security policies requires one or both of:
performing the transaction using a first personal device and separately authorizing it using a second personal device, which is separate from the first personal device; and
authorizing the transaction by using at least two separate personal devices.

11. The method according to claim 9, wherein the subset of applied security policies requires that the separate personal devices comprise at least two personal devices of a different type and/or platform.

12. The method according to claim 9, wherein the subset of applied security policies requires that a personal device of a specific type and/or platform must be used or must not be used for authorizing the transaction.

13. The method according to claim 9, wherein the subset of applied security policies depends on a financial value of the transaction and/or a history of the user account.

14. A data processing system comprising:
a memory system for storing program code instructions and data;
a processing system including at least one processing unit, wherein the processing system executes at least a portion of the program code instructions and processes the data;
wherein the memory system stores program code instructions that, when executed by the processing system, instruct the processing system to act as an authentication provider configured to perform the following acts:
at least one preparatory phase; and at least one authorization phase;
wherein the at least one preparatory phase comprises for each of several user accounts:
registering a user account via a user terminal;
registering a plurality of personal devices with the registered user account, wherein registering of a personal device comprises registering an authentication application installed in that personal device;
wherein the authentication application in the registered personal device is configured to:
indicate at least a subset of received transaction-specific details via a user interface;
receive transaction-specific instructions via the user interface; and
digitally sign the transaction-specific instructions by using a cryptographic private key assigned to the user account;
wherein the at least one authorization phase performed by the processing system comprises for each of several transactions related to one of the several user accounts:
receiving knowledge of a transaction relating to a user of a user terminal;
determining, in response to receiving the knowledge, a user account related to the transaction;
receiving a request for details specific to the transaction from at least one personal device;
checking, whether the at least one personal device wherefrom the request is received belongs to the plurality of personal devices registered with the user account determined to relate to the transaction;
providing, in response to the at least one personal device wherefrom the request is received belonging to the plurality of personal devices registered with the user account determined to relate to the transaction, the requested details specific to the transaction to the authentication application in the at least one personal device wherefrom the request for details specific to the transaction were received;
receiving, after the providing, from the authentication application in the at least one personal device a digitally signed transmission which indicates transaction-specific instructions received via the user interface by the authentication application in the at least one personal device; and
authorizing or denying the transaction based on the received transaction-specific instructions.

15. A non-transitory computer program carrier comprising program code instructions executable in a data processing system, which is operationally connectable to a user terminal, a plurality of personal devices managed by a user of the user terminal, and to at least one service provider, wherein execution of the program code instructions in the data processing system causes the data processing system to carry out a method, which comprises:

at least one preparatory phase; and
at least one authorization phase;
wherein the at least one preparatory phase comprises for each of several user accounts:
registering a user account via a user terminal;
registering a plurality of personal devices with the registered user account, wherein registering of a personal device comprises registering an authentication application installed in that personal device;
wherein the authentication application in the registered personal device is configured to:
indicate at least a subset of received transaction-specific details via a user interface;
receive transaction-specific instructions via the user interface; and
digitally sign the transaction-specific instructions by using a cryptographic private key assigned to the user account;
wherein the at least one authorization phase performed by the data processing system comprises for each of several transactions related to one of the several user accounts:
receiving knowledge of a transaction relating to a user of a user terminal;
determining, in response to receiving the knowledge, a user account related to the transaction;
receiving a request for details specific to the transaction from at least one personal device;
checking, whether the at least one personal device wherefrom the request is received belongs to the plurality of personal devices registered with the user account determined to relate to the transaction;
providing, in response to the at least one personal device wherefrom the request is received belonging to the plurality of personal devices registered with the user account determined to relate to the transaction, the requested details specific to the transaction to the authentication application in the at least one personal device wherefrom the request for details specific to the transaction were received;
receiving, after the providing, from the authentication application in the at least one personal device a digitally signed transmission which indicates transaction-specific instructions received via the user interface by the authentication application in the at least one personal device; and
authorizing or denying the transaction based on the received transaction-specific instructions.

* * * * *